(No Model.) 2 Sheets—Sheet 1.

H. VON BAYER.
METHOD OF COOLING AND FREEZING.

No. 431,244. Patented July 1, 1890.

WITNESSES:

INVENTOR
Hector von Bayer
ATTORNEY.

(No Model.) 2 Sheets—Sheet 2.
H. VON BAYER.
METHOD OF COOLING AND FREEZING.
No. 431,244. Patented July 1, 1890.
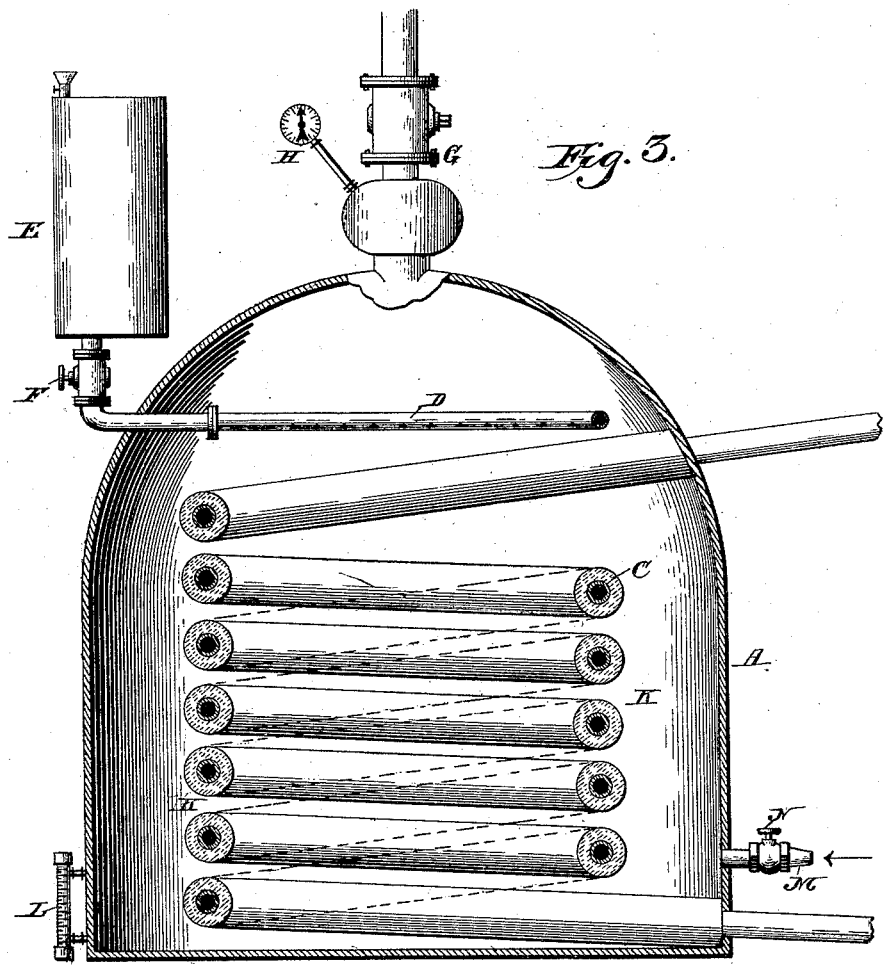
WITNESSES:
F. L. Ourand
W. A. Smith
INVENTOR
Hector von Bayer
BY Alex Mahon
ATTORNEY.

UNITED STATES PATENT OFFICE.

HECTOR VON BAYER, OF WASHINGTON, DISTRICT OF COLUMBIA, ASSIGNOR, BY DIRECT AND MESNE ASSIGNMENTS, TO THE CENTURY ICE MACHINE COMPANY, OF WEST VIRGINIA.

METHOD OF COOLING AND FREEZING.

SPECIFICATION forming part of Letters Patent No. 431,244, dated July 1, 1890.

Application filed December 3, 1889. Serial No. 332,363. (No specimens.)

*To all whom it may concern:*

Be it known that I, HECTOR VON BAYER, of the city of Washington, in the District of Columbia, have invented new and useful Improvements in the Method of Cooling and Freezing, of which the following is a full and exact description, reference being had to the accompanying drawings, making part of this specification.

My invention relates to the method of cooling air and cooling and freezing liquids or other substances.

My invention consists, first, in the method of cooling or freezing by creating and maintaining a vacuum or partial vacuum in a chamber and admitting air of atmospheric pressure into the chamber, causing the same to perform "outer work" during expansion by meeting with a resistance.

The method also consists in admitting to a chamber in which a vacuum or partial vacuum is maintained air of atmospheric pressure to expand against a resistance offered by a body of water or any other stable or volatile liquid placed within the chamber.

The method also consists in creating and maintaining a vacuum or partial vacuum in a chamber and admitting thereto air of atmospheric pressure to expand against a resistance offered, and in cooling or freezing within a chamber partly or wholly surrounded by a vacuum-chamber, but not communicating therewith.

Any suitable apparatus may be employed in practicing my method, two forms of which are shown in the accompanying drawings, in which—

Figure 1:
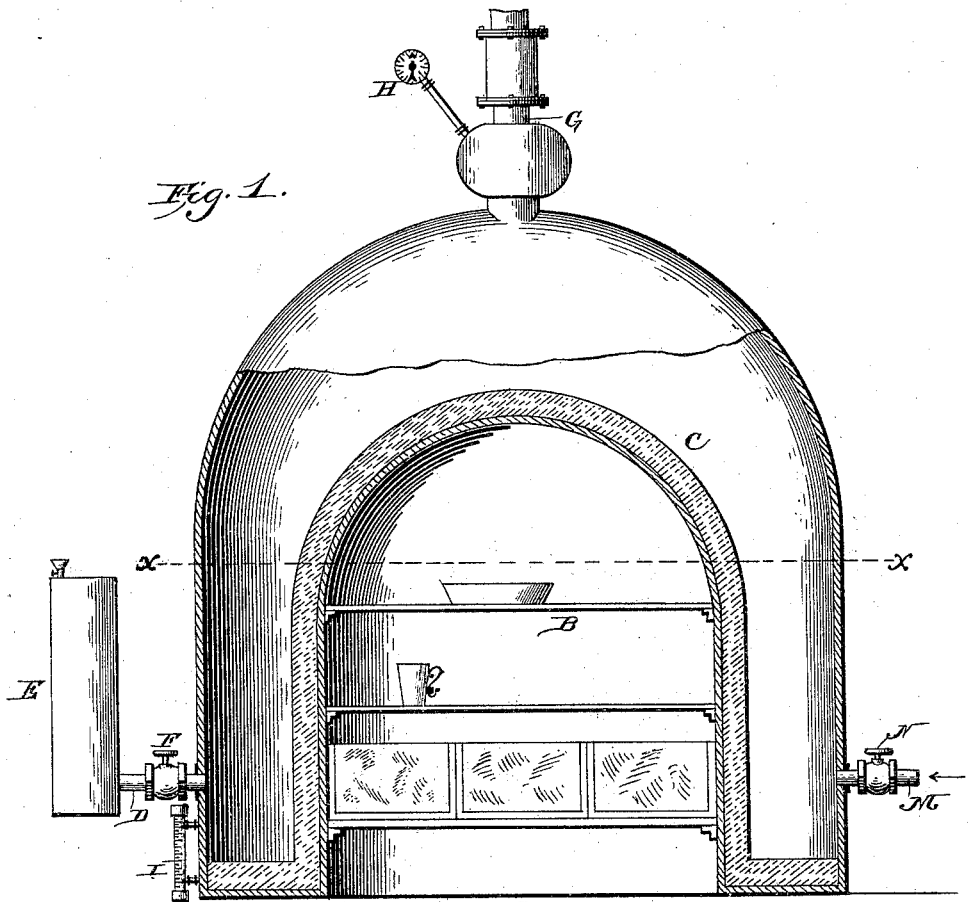
Figure 2:
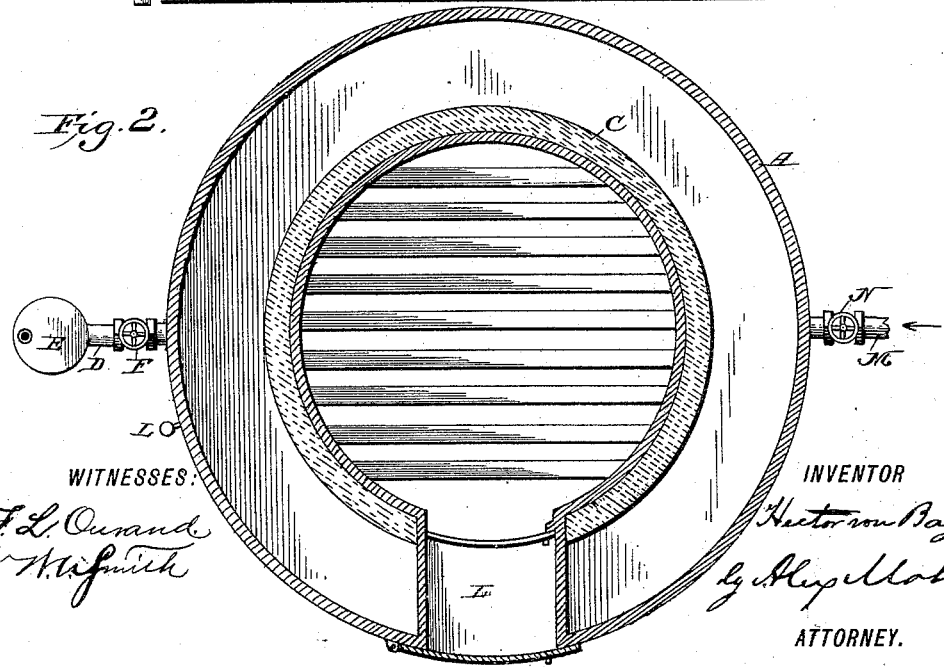

Figure 1 represents a view, partly in elevation and partly in section, of an apparatus in which the several features of my method are illustrated. Fig. 2 represents a horizontal section taken on the line *x x* of Fig. 1; and Fig. 3 represents a view, partly in section and partly in elevation, showing one modification of the apparatus for the cooling of a current of air or of a non-congeable liquid passing within a coil.

In one manner of practicing my method the chamber A, in which the exhaust is formed, is composed of any suitable material to withstand the external pressure, and from which leads an exhaust-pipe G to communicate with an exhaust-pump in any preferred way, and in this is placed a liquid, stable or volatile, to a suitable height corresponding to the capacity of the machine. Near the bottom of the vacuum or partial-vacuum chamber is an inlet or air pipe M, through which air of atmospheric pressure is admitted to the chamber, the quantity being regulated by a stop-cock N of any usual or preferred construction.

When the cooling or freezing is to be done with an apparatus, as shown in Fig. 1, an inner shell or chamber is located within the vacuum or partial-vacuum chamber A, which does not communicate with said chamber A, and the space within the inner shell constituting the cooling or freezing chamber, and which chamber is shown as provided with shelves or supports B for boxes or trays for holding liquids or to support other material.

A liquid-gage L is connected to the bottom of the vessel for indicating the amount of liquid in the vacuum-chamber, so that a sufficient quantity may be always kept therein to produce the best results in accordance with the amount of air admitted, the liquid being shown as supplied from a tank E, communicating with the vacuum or partial-vacuum chamber through a pipe D, which pipe is provided with a suitable stop-cock to regulate the supply.

The apparatus as thus constructed operates in the following manner: Where water is used as the resisting medium, the supply from the tank is turned on until the gage indicates that a sufficient quantity is in the vessel. The vacuum-pump is then put in action, which serves to exhaust the air from the chamber and discharge the same into the atmosphere. After a sufficient quantity has been exhausted to reduce the pressure to the desired point the stop-cock N is opened to a greater or less extent, causing the outer or warm air, or that of atmospheric pressure, to be drawn into the vacuum or partial-vacuum chamber, which, in consequence of the sudden expansion against the resisting body of liquid, performs outer work, and, as a result, acting to reduce the temperature of the entire volume within the vacuum or partial-vacuum chamber, and continue to still further reduce said temperature, according to the length of time the exhaust and admission continues, the exhausted air being discharged by the pump directly into the atmosphere. It will be seen from the above that as the air at atmospheric pressure is admitted to the vacuum or partial-vacuum chamber it is caused to meet a resistance and perform outer work at the expense of its inner heat, and that the air in its passage through the resisting body of liquid also causes intensified vaporization of the same, and as a consequence the temperature is lowered by a twofold cause—viz., the expansion of air against a resistance performing outer work, and by the simultaneous vaporization of the liquid.

In the modification shown in Fig. 3 of the drawings the vacuum or partial - vacuum chamber has extending or located with the same a coiled pipe or worm K. In this case the liquid is supplied from a tank E, communicating with a pipe D, provided with a series of minute holes, and the air is admitted to the vacuum-chamber near the bottom or in a direction to meet a resistance from the admitted liquid to cause the air to perform outer work. The pipe, as is also the inner face of the vacuum-chamber or the face of the vessel contained within the chamber, is covered with a capillary material by which the evaporating-surface is greatly increased.

In the modification the liquid is admitted to the vacuum or partial-vacuum chamber and falls upon the capillary material covering the pipe until the same is fully saturated, and is continued to be fed until a sufficient quantity of liquid is in the chamber to offer the proper resistance to the air, as before described, and operating in a similar manner.

Having now described my invention, I claim—

1. The method herein described of cooling or freezing by creating and maintaining a vacuum or partial vacuum in a closed chamber containing a substance to be refrigerated and admitting air of atmospheric pressure into the chamber, and causing the same to perform outer work during expansion by meeting with a resistance, substantially as set forth.

2. The method herein described of cooling or freezing, which consists in admitting to a chamber in which a vacuum or a partial vacuum is maintained air of atmospheric pressure, and causing the same to expand against a resistance offered by a body or volume of liquid within the chamber, substantially as described.

3. The method herein described of cooling or freezing substances deposited in a closed chamber, which consists in creating and maintaining a partial vacuum around the conductive walls of the same, and admitting air of atmospheric pressure to expand against a moving resistance therein, substantially as described.

In testimony whereof I have hereunto set my hand this 27th day of November, A. D. 1889.

HECTOR VON BAYER.

Witnesses:
ALEX. MAHON,
H. M. STERLING.